United States Patent
Krishnaswamy et al.

(10) Patent No.: US 8,723,987 B2
(45) Date of Patent: May 13, 2014

(54) UNCERTAINTY ESTIMATION OF PLANAR FEATURES

(75) Inventors: Kailash Krishnaswamy, Little Canada, MN (US); Sara Susca, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 995 days.

(21) Appl. No.: 12/609,576

(22) Filed: Oct. 30, 2009

(65) Prior Publication Data

US 2011/0102545 A1 May 5, 2011

(51) Int. Cl.
*H04N 9/68* (2006.01)

(52) U.S. Cl.
USPC .............................. 348/236; 348/46; 348/237

(58) Field of Classification Search
USPC .......................................... 348/46, 43, 49, 50
See application file for complete search history.

(56) References Cited

U.S. PATENT DOCUMENTS

| | | | |
|---|---|---|---|
| 6,476,803 B1 | 11/2002 | Zhang et al. | |
| 7,436,988 B2 | 10/2008 | Zhang et al. | |
| 7,574,020 B2 | 8/2009 | Shamaie | |
| 2006/0188849 A1 | 8/2006 | Shamaie | |
| 2008/0167814 A1 | 7/2008 | Samarasekera et al. | |
| 2008/0310757 A1* | 12/2008 | Wolberg et al. | 382/285 |
| 2009/0167759 A1* | 7/2009 | Ushida et al. | 345/420 |
| 2010/0034426 A1* | 2/2010 | Takiguchi et al. | 382/106 |
| 2010/0149174 A1* | 6/2010 | Nakao et al. | 345/419 |
| 2010/0220204 A1* | 9/2010 | Fruehauf et al. | 348/222.1 |
| 2010/0315412 A1* | 12/2010 | Sinha et al. | 345/419 |

OTHER PUBLICATIONS

Hoppe et al. , "Surface Reconstruction From Unorganized Points", 1992, pp. 71-78, Publisher: University of Washington.
Pauly et al. , "Efficient Simplification of Point-Sampled Surfaces", "http://www.agg.ethz.ch/publications/journal_and_conference/#2002", 2002, Publisher: IEEE Visualization 2002.
Pauly et al. , "Uncertainty and Variability in Point Cloud Surface Data", "http://www.agg.ethz.ch/publications/journal_and_conference/#2004", 2004, Publisher: Symposium on Point-Based Graphics.
Pauly et al. , "Point-Based Multi-Scale Surface Representation", "http://www.agg.ethz.ch/publications/journal_and_conference/#2006", Apr. 2, 2006, pp. 177-193, vol. 25, No. 2, Publisher: ACM Transactions on Graphics 2006.

* cited by examiner

*Primary Examiner* — Djenane Bayard
(74) *Attorney, Agent, or Firm* — Fogg & Powers LLC (57) ABSTRACT

In one embodiment, a method comprises generating three-dimensional (3D) imaging data for an environment using an imaging sensor, extracting an extracted plane from the 3D imaging data, and estimating an uncertainty of an attribute associated with the extracted plan. The method further comprises generating a navigation solution using the attribute associated with the extracted plane and the estimate of the uncertainty of the attribute associated with the extracted plane.

18 Claims, 5 Drawing Sheets

UNCERTAINTY ESTIMATION OF PLANAR FEATURES

BACKGROUND

An environment where Global Positioning Satellite (GPS) technology is not operational is referred to here as a "GPS-denied" environment. In GPS-denied environments, navigation systems that do not rely on GPS typically must be used. Historically, such navigation systems make use of an inertial measurement unit (IMU).

Recently, however, there has been significant interest in developing navigation systems for GPS-denied environments that do not completely rely on an IMU. One such approach employs a three-dimensional (3D) light detection and ranging (LIDAR) sensor. A 3D LIDAR produces a 3D range image of the environment. Using the 3D range image, it is possible to extract planes and other geometric shapes (also referred to here as "features") in the environment. These features, if unique, can then be used as landmarks to aid navigation. A standard method of navigation using such landmarks employs simultaneous localization and mapping (SLAM). SLAM is used to build up a map within an environment while at the same time keeping track of a current location for a vehicle or person. Like a stochastic Kalman filter, SLAM needs an estimate of the location of the extracted feature and an estimate of the uncertainty in the location of the extracted feature.

It is important to capture the uncertainty in the location of an extracted feature accurately due to the dependence of the performance of SLAM on the quality of the location measurement and uncertainty estimate. If the uncertainty is not properly estimated the Kalman filter loses its optimality property and the measurements are not given the proper gain.

SUMMARY

In one embodiment, a method comprises generating three-dimensional (3D) imaging data for an environment using an imaging sensor, extracting an extracted plane from the 3D imaging data, and estimating an uncertainty of an attribute associated with the extracted plan. The method further comprises generating a navigation solution using the attribute associated with the extracted plane and the estimate of the uncertainty of the attribute associated with the extracted plane.

In another embodiment, an apparatus comprises an imaging sensor to generate three-dimensional (3D) imaging data for an environment and a processor communicatively coupled to the imaging sensor. The processor is configured to extract an extracted plane from the 3D imaging data, estimate an uncertainty of an attribute associated with the extracted plan; and generate a navigation solution using the attribute associated with the extracted plane and the estimate of the uncertainty of the attribute associated with the extracted plane.

Another embodiment is directed to a program product for use with an imaging sensor that generates three-dimensional (3D) imaging data for an environment. The program-product comprises a processor-readable medium on which program instructions are embodied. The program instructions are operable, when executed by at least one programmable processor included in a device, to cause the device to: receive the 3D imaging data from the imaging sensor; extract an extracted plane from the 3D imaging data; estimate an uncertainty of an attribute associated with the extracted plan; and generate a navigation solution using the attribute associated with the extracted plane and the estimate of the uncertainty of the attribute associated with the extracted plane.

DETAILED DESCRIPTION

Figure 1:
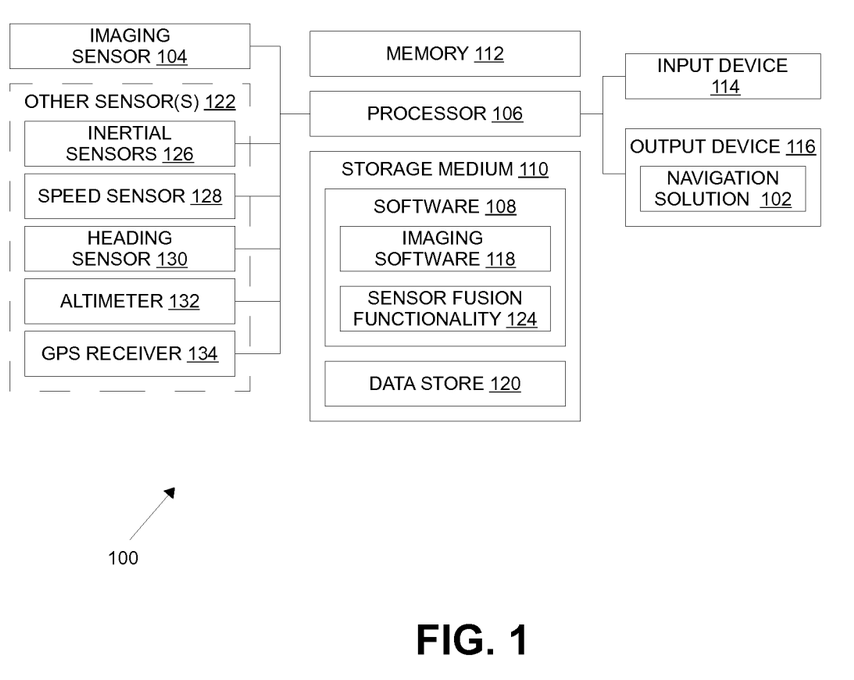
FIG. 1 is a block diagram of one embodiment of a navigation system.

FIG. 1 is a block diagram of one embodiment of a navigation system 100. System 100 is used to generate a navigation solution 102 from imaging data generated by an imaging sensor 104. In the particular embodiment shown in FIG. 1, the navigation system 100 is deployed in a ground vehicle (for example, a car or truck) and the navigation system 100 is used to generate a navigation solution 102 for the vehicle as it moves through an environment.

As used herein, a "navigation solution" comprises information about the location (position) and/or movement of the vehicle. Examples of such information include information about a past, current, or future absolute location of the vehicle, a past, current, or future relative location of the vehicle, a past, current, or future velocity of the vehicle, and/or a past, current, or future acceleration of the vehicle. A navigation solution can also include information about the location and/or movement of other objects within the environment.

The imaging sensor 104 is used to generate imaging data for the environment. In the particular embodiment described here in connection with FIG. 1, the imaging sensor 104 comprises a LIDAR. A LIDAR is a measuring system that detects and locates objects using techniques similar to those used with Radio Detection and Ranging (RADAR) systems but using a laser instead of radio frequency signals. In one implementation of such an embodiment, the sensor element of the LIDAR rotates 360 degrees so that objects in all directions can be located and ranged. Range measurements from the sensor element to points on the surface of objects in the environment are made, as well as measurements of the orientation of the sensor element when the range measurements are made. In some implementations of this embodiment, the LIDAR also outputs a color and intensity for each range measurement it makes. This raw imaging data is also referred to here as a "range image." Although this embodiment is described here as using a LIDAR, it will be understood that other types of imaging sensors or devices can be used (such as stereo vision cameras, millimeter wave RADAR sensors, and ultrasonic range finders).

The system 100 further comprises one or more programmable processors 106 for executing software 108. The software 108 comprises program instructions that are stored (or otherwise embodied) on an appropriate storage medium or media 110 (such as flash or other non-volatile memory, magnetic disc drives, and/or optical disc drives). At least a portion of the program instructions are read from the storage medium 110 by the programmable processor 106 for execution thereby. The storage medium 110 on or in which the program instructions are embodied is also referred to here as a "program product". Although the storage media 110 is shown in FIG. 1 as being included in, and local to, the system 100, it is to be understood that remote storage media (for example, storage media that is accessible over a network or communication link) and/or removable media can also be used. The system 100 also includes memory 112 for storing the program instructions (and any related data) during execution by the programmable processor 106. Memory 112 comprises, in one implementation, any suitable form of random access memory (RAM) now known or later developed, such as dynamic random access memory (DRAM). In other embodiments, other types of memory are used.

One or more input devices 114 are communicatively coupled to the programmable processor 106 by which a user is able to provide input to the programmable processor 106 (and the software 108 executed thereby). Examples of input devices include a keyboard, keypad, touch-pad, pointing device, button, switch, and microphone. One or more output devices 116 are also communicatively coupled to the programmable processor 106 on or by which the programmable processor 106 (and the software 108 executed thereby) is able to output information or data to a user. Examples of output devices 116 include visual output devices such as liquid crystal displays (LCDs), light emitting diodes (LEDs), or audio output devices such as speakers. In the embodiment shown in FIG. 1, at least a portion of the navigation solution 102 is output on the output device 116.

The software 108 comprises imaging software 118 that processes the imaging data output by the imaging sensor 104. In the particular embodiment described here in connection with FIG. 1, the imaging software 118 converts the raw range and orientation information output by the imaging device 104 into a set of vertices in a three-dimensional coordinate system. Each vertex identifies the location of a point on the surface of an object located in the environment. The set of vertices is also referred to here as a "point cloud".

The imaging software 118 is configured to use landmarks to generate navigation solutions 102. In the particular embodiment described herein, the imaging software 118 is configured to use a simultaneous localization and mapping (SLAM) algorithm. As part of this algorithm, points in the point cloud that potentially lie on a planar structure are identified and the plane containing such points is extracted from the point cloud. This plane is also referred to here as the "extracted plane" or "planar feature". As a part of such processing, a Kalman filter (not shown) used in the SLAM algorithm needs an estimate of the uncertainty associated with the location of the extracted plane. One approach to estimating the uncertainty of the location of an extracted plane is described below in connection with FIG. 2.

In the particular embodiment shown in FIG. 1, the system 100 further comprises a data store 120 to and from which landmark and/or map information generated and/or used by the imaging software 118 can be stored and read in connection with the processing it performs.

In the particular embodiment shown in FIG. 1, the system 100 includes, in addition to the imaging sensor 104, one or more other sensors 122. In this embodiment, the software 108 further comprises sensor fusion functionality 124 that combines navigation-related information derived from the imaging sensor 104 and the other sensors 122 as a part of generating the navigation solution 102. The other sensors 122, in this embodiment, include one or more inertial sensors 126 (such as accelerometers and gyroscopes), one or more speed sensors 128, one or more heading sensors 130, one or more altimeters 132, and one or more GPS receivers 134. In other embodiments, however, other combinations of sensors can be used. In one implementation of such an embodiment, the sensor fusion functionality 124 comprises a Kalman filter.

Figure 2:
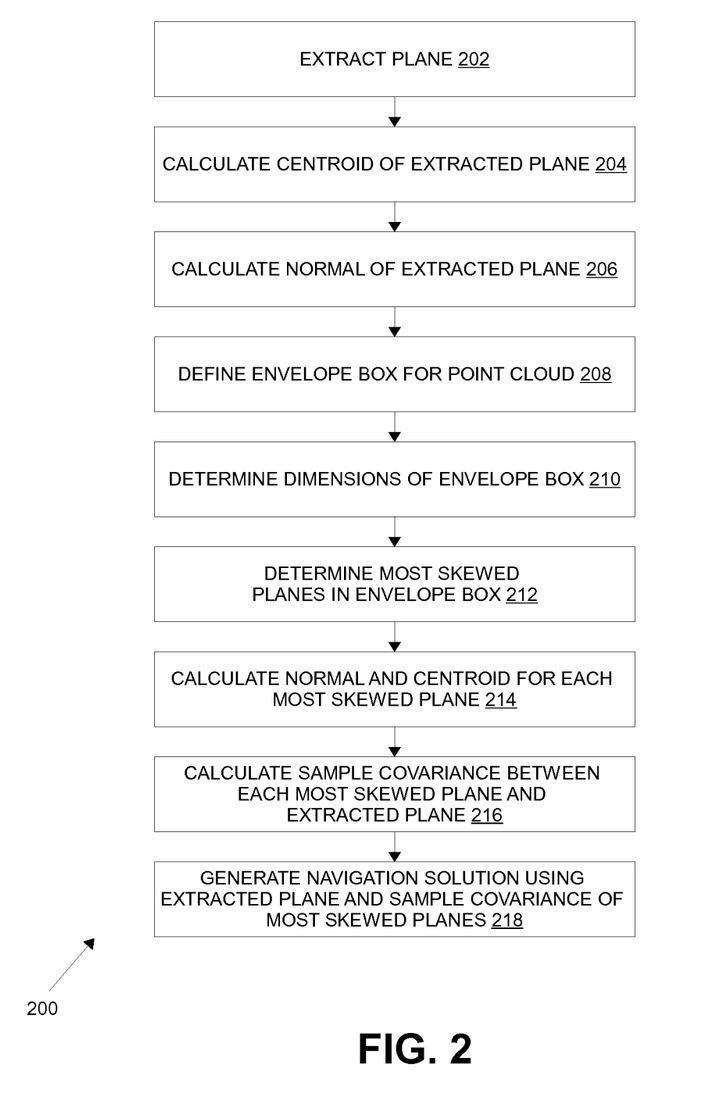
FIG. 2 is a flow diagram of one embodiment of a method of estimating the uncertainty of a location of a plane extracted from a point cloud.

FIG. 2 is a flow diagram of one embodiment of a method 200 of estimating the uncertainty of the location of a plane extracted from a point cloud. The embodiment of method 200 shown in FIG. 2 is described here as being implemented using the system 100 of FIG. 1, though other embodiments can be implemented in other ways. In particular, the embodiment of method 200 shown in FIG. 2 is implemented by the imaging software 118.

Method 200 comprises extracting a plane from the point cloud (block 202), calculating a centroid for the extracted plane (block 204), and calculating a normal vector for the extracted plane (block 206). As noted above, the imaging software 118 converts the raw range and orientation measurements output by the imaging sensor 104 into a point cloud within a 3D coordinate system for the environment of interest. The plane can be extracted from the point cloud, the centroid can be calculated for the extracted plane, and the normal vector can be calculated for the extracted plane in a conventional manner using techniques known to one of ordinary skill in the art (for example, as a part of the SLAM algorithm described above).

Method 200 further comprises defining an envelope that encloses the point cloud (block 208). The envelope comprises a box (also referred to here as the "envelope box") that is centered about the centroid of the extracted plane and has twelve edges that are defined by three vectors: the normal vector of the extracted plane and two vectors that are both perpendicular to the normal vector of the extracted plane and perpendicular to one another. That is, four of the edges of the box are directed along the normal vector for the extracted plane, another four edges of the box are directed along a first of the two perpendicular vectors, and the other four edges of the box are directed along a second of the two perpendicular vectors. Also, the box comprises eight vertices corresponding to the eight corners of box.

Figure 3A:
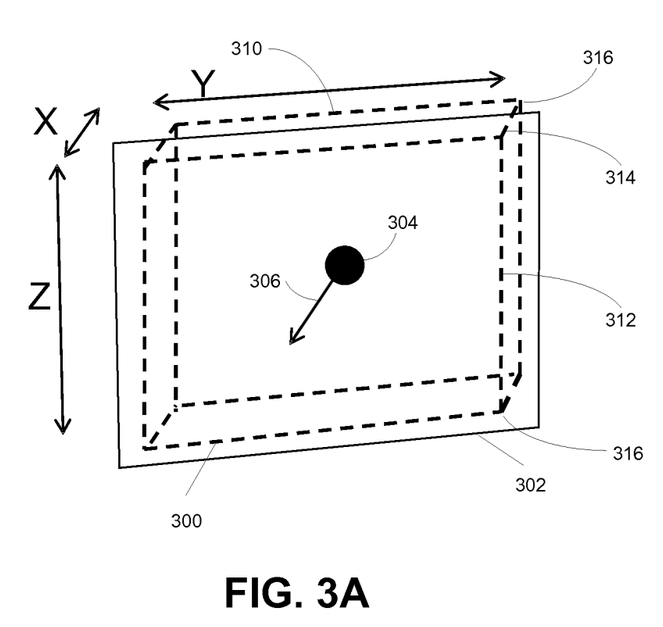
FIGS. 3A and 3B illustrate one example of an envelope box.

One example of an envelope box 300 for an extracted plane 302 is shown in FIG. 3A. The centroid 304 and normal vector 306 of the extracted plane 302 are shown in FIG. 3A. The envelope box 300 is centered about the centroid 304 of the extracted plane 302. The envelope box 300 has twelve edges 310, 312, and 314. As noted above, the edges 310, 312, and 314 of the box 300 are defined by the normal vector 306 of the extracted plane and two vectors that are both perpendicular to the normal vector 306 of the extracted plane 302 and perpendicular to one another. More specifically, the envelope box 300 is defined so that four of the edges 314 are directed along the normal vector 306 of the extracted plane 302, another four of the edges 310 of the box 300 are directed along a first of the two perpendicular vectors, and the other four edges 312 of the box 300 are directed along a second of the two perpendicular vectors. Also, as shown in FIG. 3A, the box 300 has eight vertices 316 corresponding to the eight corners of the box 300.

As shown in FIG. 2, method 200 further comprises determining the dimensions (that is, the length, width, and thickness) of the envelope box using a distribution of the points in the point cloud with respect to the centroid of the extracted plane (block 210). In this embodiment, the length and width of the envelope box are the dimensions of the envelope box in the same plane as the extracted plane, while the thickness is the dimension of the envelope box along the normal of the extracted plane.

Each of the dimensions of the envelope box is equal to twice the mean distance of the points in the point cloud to the centroid of the extracted plane along the respective dimension. One approach to calculating the dimension of the envelope box is described below in connection with FIG. 4.

Method 200 further comprises determining the eight most skewed planes in the envelope box defined for the extracted plane (block 212). As used herein, a "most skewed plane" is a plane that is formed by 3 diagonal vertices of the envelope box. Also, any two of the diagonal vertices form a surface diagonal of the envelope box. Each of the eight most skewed planes is determined by fitting a plane through a respective three vertices of the box. The skewed planes are fitted in a conventional manner using techniques known to one of skill in the art.

Figure 3B:
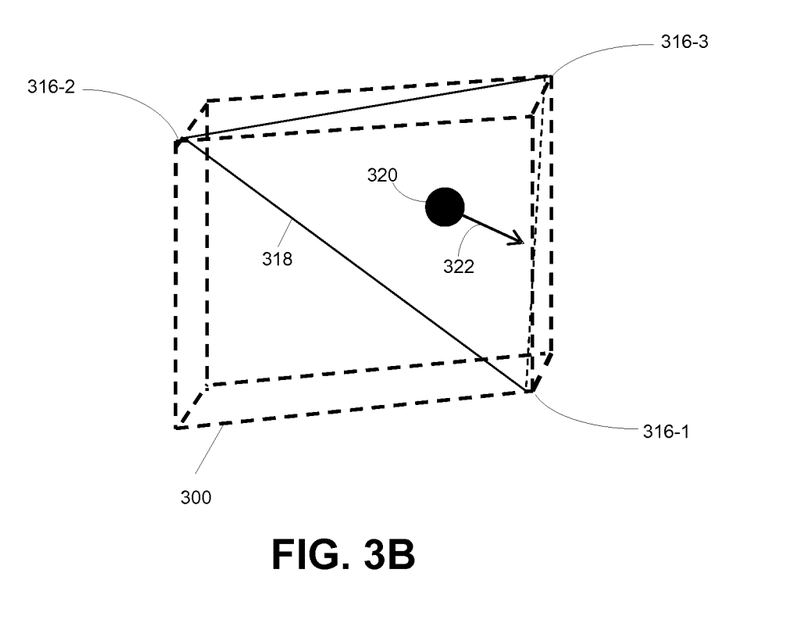

One example of a most skewed plane 318 for the envelope box 300 shown in FIG. 3A is shown in FIG. 3B. As shown in FIG. 3B, the most skewed plane 318 is fitted through three of the vertices 316 (labeled 316-1, 316-2, and 316-3 in FIG. 3B) of the box 300.

As shown in FIG. 2, method 200 further comprises calculating a respective normal vector and centroid for each of the eight most skewed planes (block 214) and calculating a respective sample covariance between each of the most skewed planes and the extracted plane (block 216). The sample covariance for each of the most skewed planes is calculated by calculating a sample covariance between the respective normal vector for that most skewed plane and the normal vector for the extracted plane and a sample covariance between the centroid for that most skewed plane and the centroid for the extracted plane. Such calculations are performed in a conventional manner using techniques known to one of skill in the art.

In the example shown in FIG. 3B, a centroid 320 and normal vector 322 for the exemplary most skewed plane 318 are calculated. The sample covariance between the normal vector 322 for that most skewed plane 318 and the normal vector 306 for the extracted plane 302 is calculated. The sample covariance between the centroid 320 for that most skewed plane 318 and the centroid 304 of the extracted plane 302 is also calculated.

As shown in FIG. 2, method 200 further comprises generating a navigation solution 102 using an attribute associated with the extracted plane and an attribute associated with the sample covariance for each of the most skewed planes (block 218). In this example, the sample covariances for the most skewed planes (or some attributed derived therefrom) are used at least in part as an estimate of the uncertainty in the location of the extracted plane. These sample covariances are used by the Kalman filter that is a part of the SLAM algorithm. The output of the SLAM algorithm is used in generating the navigation solution 102 as described above in connection with FIG. 1.

Figure 4:
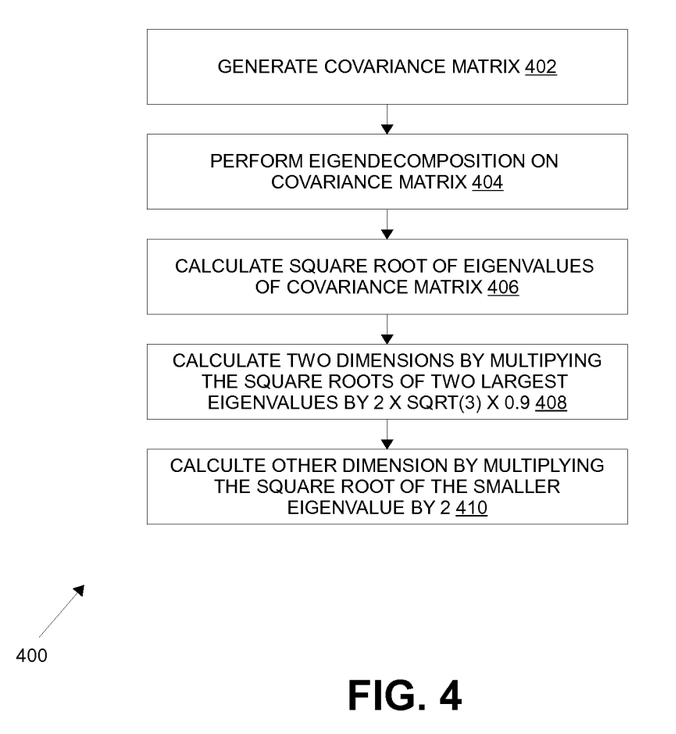
FIG. 4 is a flow diagram of one embodiment of a method of calculating the dimensions of an envelope box.

FIG. 4 is a flow diagram of one embodiment of a method 400 of calculating the dimensions of an envelope box. The embodiment of method 400 shown in FIG. 4 is described here as being implemented using the system 100 of FIG. 1 and method 200 of FIG. 2, though other embodiments can be implemented in other ways. In particular, the embodiment of method 400 shown in FIG. 4 is implemented by the imaging software 118.

Method 400 comprises generating a covariance matrix that includes a respective vector between each of the points in the extracted plane and the centroid of the extracted plane (block 402), performing an eigendecomposition on the covariance matrix to generate a set of eigenvalues and a set of corresponding eigenvectors for the covariance matrix (block 404), and calculating a respective square root for each of the set of eigenvalues for the covariance matrix (block 406). The covariance matrix is calculated, the eigendecomposition on the covariance matrix is performed, and the square roots are calculated in a conventional manner using techniques known to one of skill in the art.

The dimensions of the envelope box are calculated as a function of at least one of the eigenvalues for the covariance matrix. In this particular embodiment, method 400 further comprises calculating two of the dimensions of the envelope box by multiplying the square root of the two largest eigenvalues by the product resulting from multiplying 2, the square root of 3, and 0.9 (block 408) and calculating the other dimension by multiplying the square root of the smallest eigenvalue by 2 (block 410).

In the examples shown in FIGS. 3A and 3B, the length and width 310 and 312 of the envelope box 300 for the extracted plane 302 are calculated by multiplying the square root of the two largest eigenvalues by the product resulting from multiplying 2, the square root of 3, and 0.9. The thickness 314 of the envelope box 300 is calculated by multiplying the square root of the smallest eigenvalue by 2.

Although the embodiment shown in FIGS. 1-4 is described here as using a SLAM algorithm to determine a navigation solution, it is to be understood that the technique for estimating the uncertainty of planar features described here can be used with other image-based navigation techniques and algorithms. One example of such an image-base navigation technique uses extracted planar features to determine the incremental rotation and translation of a vehicle and/or other objects within an environment of interest. In such an example, features are extracted from two 3D images and matched. Motion across the two 3D images is calculated using any matched features. With such an image-based navigation technique, a Kalman filter can also be used, and the techniques described here for estimating the uncertainty of extracted planar features can be used to generate uncertainty estimates for use by the Kalman filter.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method comprising:
generating three-dimensional (3D) imaging data for an environment using an imaging sensor;
extracting an extracted plane from the 3D imaging data
estimating an uncertainty of an attribute associated with the extracted plan; and
generating a navigation solution using the attribute associated with the extracted plane and the estimate of the uncertainty of the attribute associated with the extracted plane;
wherein the extracted plane is extracted from a point cloud comprising a plurality of points, the point cloud derived from the 3D imaging data; and
wherein estimating the uncertainty of the attribute of associated with the extracted plan comprises:
calculating a centroid for the extracted plane;
calculating a normal vector for the extracted plane;
defining an envelope box that encloses the points in the point cloud;
determining a plurality of most skewed planes in the envelope box, wherein each of the most skewed planes is determined by fitting a plane through a respective three vertices of the envelope box;
calculating a respective normal vector and centroid for each of the most skewed planes; and
calculating sample covariances between the most skewed planes and the extracted plane.

2. The method of claim 1, wherein the envelope box comprises a plurality of edges, wherein each of the plurality of edges is defined by one of: the normal vector of the extracted plane and two vectors perpendicular to the normal vector of the extracted plane and perpendicular to one another; and
wherein the method further comprises determining dimensions of the envelope box using a distribution of the points in the point cloud with respect to the centroid of the extracted plane, wherein each of the dimensions of the envelope box is equal to twice the mean distance of the points in the point cloud to the centroid along that respective dimension; and
wherein calculating the sample covariances between the most skewed planes and the extracted plane comprises:
calculating a respective sample covariance between the respective normal vector for each most skewed plane and the normal vector for the extracted plane; and
calculating a respective sample covariance between the respective centroid for each most skewed plane and the centroid of the extracted plane.

3. The method of claim 2, wherein the dimensions of the envelope box are determined by:
calculating a covariance matrix that includes a respective vector between each of the points in the point cloud and the centroid of the extracted plane;
performing an eigendecomposition on the covariance matrix to generate a set of eigenvalues and a set of corresponding eigenvectors for the covariance matrix;
calculating a respective square root for each of the set of eigenvalues for the covariance matrix; and
calculating each of the dimensions of the envelope box as a function of at least one of the eigenvalues for the covariance matrix.

4. The method of claim 3, comprising calculating two of the dimensions of the envelope box by multiplying the square root of the two largest eigenvalues by a product of multiplying 2, a square root of 3, and 0.9; and
calculating a third dimension of the envelope box by multiplying the square root of the smallest eigenvalue by 2.

5. The method of claim 1, wherein the plurality of most skewed planes comprises eight most skewed planes.

6. The method of claim 1, wherein the imaging sensor comprises at least one of: a three-dimensional (3D) light detection and ranging (LIDAR) sensor, a stereo vision camera, a millimeter wave RADAR sensor, and an ultrasonic range finder; and
wherein the navigation solution is generated using at least one of: a simultaneous localization and mapping (SLAM) algorithm and an incremental translation and rotation algorithm.

7. A method comprising:
generating three-dimensional (3D) imaging data for an environment using an imaging sensor;
extracting an extracted plane from the 3D imaging data;
estimating an uncertainty of an attribute associated with the extracted plan; and
generating a navigation solution using the attribute associated with the extracted plane and the estimate of the uncertainty of the attribute associated with the extracted plane;
using the estimate of the uncertainty of the attribute associated with the extracted plane as an input to a sensor fusion process to generate the navigation solution as a function of sensor data output by at least one other sensor, the attribute associated with the extracted plane, and the uncertainty of the attribute associated with the extracted plane.

8. An apparatus comprising:
an imaging sensor to generate three-dimensional (3D) imaging data for an environment; and
a processor communicatively coupled to the imaging sensor, wherein the processor is configured to:
extract an extracted plane from the 3D imaging data;
estimate an uncertainty of an attribute associated with the extracted plan; and
generate a navigation solution using the attribute associated with the extracted plane and the estimate of the uncertainty of the attribute associated with the extracted plane;
wherein the extracted plane is extracted from a point cloud comprising a plurality of points, the point cloud derived from the 3D imaging data; and
wherein the processor is configured to do the following in order to estimate the uncertainty of the attribute of associated with the extracted plane:
calculate a centroid for the extracted plane;
calculate a normal vector for the extracted plane;
define an envelope box that encloses the points in the point cloud;
determine a plurality of most skewed planes in the envelope box, wherein each of the most skewed planes is determined by fitting a plane through a respective three vertices of the envelope box;
calculate a respective normal vector and centroid for each of the most skewed planes; and
calculate sample covariances between the most skewed planes and the extracted plane.

9. The apparatus of claim 8, wherein the envelope box comprises a plurality of edges, wherein each of the plurality of edges is defined by one of: the normal vector of the extracted plane and two vectors perpendicular to the normal vector of the extracted plane and perpendicular to one another; and wherein the processor is further configured to determine dimensions of the envelope box using a distribution of the points in the point cloud with respect to the centroid of the extracted plane, wherein each of the dimensions of the envelope box is equal to twice the mean distance of the points in the point cloud to the centroid along that respective dimension; and wherein the processor is further configured to calculate the sample covariances between the most skewed planes and the extracted plane by doing the following:

calculating a respective sample covariance between the respective normal vector for each most skewed plane and the normal vector for the extracted plane; and calculating a respective sample covariance between the respective centroid for each most skewed plane and the centroid of the extracted plane.

10. The apparatus of claim 8, wherein the processor is configured to determine the dimensions of the envelope box by:

calculating a covariance matrix that includes a respective vector between each of the points in the point cloud and the centroid of the extracted plane;

performing an eigendecomposition on the covariance matrix to generate a set of eigenvalues and a set of corresponding eigenvectors for the covariance matrix;

calculating a respective square root for each of the set of eigenvalues for the covariance matrix; and calculating each of the dimensions of the envelope box as a function of at least one of the eigenvalues for the covariance matrix.

11. The apparatus of claim 10, wherein the processor is configured to calculate two of the dimensions of the envelope box by multiplying the square root of the two largest eigenvalues by a product of multiplying 2, a square root of 3, and 0.9; and wherein the processor is configured to calculate a third dimension of the envelope box by multiplying the square root of the smallest eigenvalue by 2.

12. The apparatus of claim 8, wherein the plurality of most skewed planes comprises eight most skewed planes.

13. The apparatus of claim 8, wherein the imaging sensor comprises at least one of: a three-dimensional (3D) light detection and ranging (LIDAR) sensor, a stereo vision camera, a millimeter wave RADAR sensor, and an ultrasonic range finders; and wherein the processor is configured to generate the navigation solution using at least one of: a simultaneous localization and mapping (SLAM) algorithm and an incremental translation and rotation algorithm.

14. The apparatus of claim 8, further comprising an output device to output at least a portion of the navigation solution.

15. An apparatus comprising:

an imaging sensor to generate three-dimensional (3D) imaging data for an environment; and a processor communicatively coupled to the imaging sensor, wherein the processor is configured to:

extract an extracted plane from the 3D imaging data;

estimate an uncertainty of an attribute associated with the extracted plan;

generate a navigation solution using the attribute associated with the extracted plane and the estimate of the uncertainty of the attribute associated with the extracted plane; and at least one other sensor that generates sensor data, wherein the processor is configured to use the estimate of the uncertainty of the attribute associated with the extracted plane as an input to a sensor fusion process performed by the processor to generate the navigation solution as a function of the sensor data, the attribute associated with the extracted plane, and the estimate of the uncertainty of the attribute associated with the extracted plane.

16. The apparatus of claim 15, wherein the sensor fusion process comprises a Kalman filter.

17. The apparatus of claim 15, wherein the at least one other sensor comprises at least one of: an inertial sensor, a speed sensor, a heading sensor, an altimeter, and a global position satellite (GPS) receiver.

18. A program product for use with an imaging sensor that generates three-dimensional (3D) imaging data for an environment, the program-product comprising a non-transitory processor-readable medium on which program instructions are embodied, wherein the program instructions are operable, when executed by at least one programmable processor included in a device, to cause the device to:

receive the 3D imaging data from the imaging sensor;

extract an extracted plane from the 3D imaging data;

estimate an uncertainty of an attribute associated with the extracted plan; and generate a navigation solution using the attribute associated with the extracted plane and the estimate of the uncertainty of the attribute associated with the extracted plane; and use the estimate of the uncertainty of the attribute associated with the extracted plane as an input to a sensor fusion process to generate the navigation solution as a function of sensor data output by at least one other sensor, the attribute associated with the extracted plane, and the uncertainty of the attribute associated with the extracted plane.

* * * * *